US006115800A

United States Patent [19]

Maeda

[11] Patent Number: 6,115,800

[45] Date of Patent: Sep. 5, 2000

[54] METHOD FOR MANAGING RECEIVED RADIO DATA

[75] Inventor: Tatsuya Maeda, Kanagawa, Japan

[73] Assignee: NEC Corporation, Tokyo, Japan

[21] Appl. No.: 08/902,523

[22] Filed: Jul. 29, 1997

[30] Foreign Application Priority Data

Jul. 30, 1996 [JP] Japan .................................... 8-200705

[51] Int. Cl.[7] ...................................................... G06F 12/02

[52] U.S. Cl. .......................................... 711/171; 455/185.1

[58] Field of Search .................................... 711/171, 110, 711/173, 172; 455/161.2, 166.1, 194.1, 161.1, 150.1, 185.1–186.1; 707/3, 100, 101–102, 205

[56] References Cited

U.S. PATENT DOCUMENTS 5,220,682 6/1993 Tomohiro ............................. 455/161.2
5,226,155 7/1993 Iijima ...................................... 707/205
5,471,662 11/1995 Shiota .................................. 455/166.1
5,745,845 4/1998 Suenaga et al. ..................... 455/194.1
5,860,135 1/1999 Sugita ..................................... 711/173

OTHER PUBLICATIONS

Nohse, "Practical RDS Receiver Considerations," IEEE RDS Colliquium London, pp. 1–16, Dec. 15, 1909.

*Primary Examiner*—John W. Cabeca
*Assistant Examiner*—Denise Tran
*Attorney, Agent, or Firm*—McGuire Woods

[57] ABSTRACT

A data storing method and a data searching method for the stored data for improving memory employment efficiency of RDS reception data while maintaining searching processing speed of PI code, in the data storing method and the data searching method for the stored data, read-address is set to head of PI area, there is judged whether or not the read-address agrees with PI code of storing candidate, when the read-address disagrees with PI code of storing candidate, the read-address is set to next PI storing position. Next, there is judged whether or not check of all PI code is terminated. When the check is not terminated, the processing after judgement of agreement between address PI code and PI code of storing candidate is implemented repeatedly. When there is no agreed PI code in spite of termination of check of all PI code, the storing candidate PI code and AF data are stored at the next of the rearmost of the AF data. When PI codes agree therewith each other, head of AF area of the read PI code is searched, AF data is stored in the free area.

6 Claims, 8 Drawing Sheets

METHOD FOR MANAGING RECEIVED RADIO DATA

BACKGROUND OF THE INVENTION

The present invention relates to a data storing method and a data searching method for the stored data thereby. More to particulary this invention relates to a data storing method for storing the received signal data from broadcasting of Radio-Data-System and a data searching method for searching the stored data thereby.

DESCRIPTION OF THE PRIOR ART

In general, a data used for broadcasting of Radio-Data-System (referring to as RDS hereinafter) includes a network identification code (referring to as PI code hereinafter) whose data size is fixed and a frequency data (referring to as AF data hereinafter) which is the data from a station constituting network with undefined data size. In broadcasting of the RDS, the number of AF data is restricted to at most two which are capable of being transmitted at a time.

For this reason, when there are a lot of stations constituting network, at the time of data reception, the reception of the RDS signal data is divided into several times. When it permits the AF data of the received RDS signal data to store into memory within the station, it becomes necessary to store the gathered AF data of the indentical PI code. Searching of the PI code within the memory is started as a preceding operation.

Hereinafter, storing method of the received RDS signal data as one example of former data storing method, is described referring to flowchart of FIG. 1 and memory constitution view of FIGS. 2A. 2B, and 2C. In this storing method, 8-bit single-chip microcomputer is used. FIG. 1 is a flowchart showing processing procedure of data storing. Memory constitution views of FIGS. 2A, 2B, and 2C denote memory constitution with storing capacity of AF code in every network station group as [8]. As one example, in case of memory constitution view (PI code: $PI_1$ to $PI_3$) of FIG. 2A, the memory consists of an area 51 of a network station group 1, an area 52 of a network station group 2, an area 53 of a network station group 3, and a free area 54. In the area 51 of the network station group 1, PI code $PI_1$ is stored at the head address, $AF_{1/1}$ and $AF_{1/2}$ as the AF data corresponding to the PI code are successively stored at the following address, and remaining address comes into free area 51-1. In the area 52 of the network station group 2, PI code $PI_2$ is stored at the head address, and $AF_{2/1}$, $AF_{2/2}$, $AF_{2/3}$, . . . , $AF_{2/8}$ as the AF data corresponding to the PI code are successively stored at the following address. In the area 53 of the network station group 3, PI code $PI_3$ is stored at the head address, $AF_{3/1}$, $AF_{3/2}$, and $AF_{3/3}$ as the AF data corresponding to the PI code are successively stored at the following address, and remaining address comes into free area 53-1.

As stated above, when it permits AF data of identical PI code to store into memory on the inside of the station, for gathering to store AF data of the identical PI code, searching processing of the PI code within the memory is implemented in the first place. At this case, formerly, in order to implement high-speed searching processing of the PI code, as shown in FIG. 2, storing capacity of the memory provided for each network station is formed as the fixed identical memory constitution respectively. In the memory constitution view of FIG. 2A, in order to implement the searching processing from the head address of the memory, the read-address is set to the head position of the area 51 of the network station group 1 within the memory (STEP $S_{41}$ of FIG. 1). As it is clear from FIG. 2A, the PI code [$PI_1$] is stored at the head address. The read PI code [$PI_1$] is compared with the PI code to the stored which is newly received, thus being judged whether or not the PI code [$PI_1$] agrees with the PI code to be stored (STEP $S_{42}$). In STEP $S_{42}$, when the received PI code disagrees with the PI code [$PI_1$], the read-address is set to address position where PI code [$PI_2$] is stored, in the area 52 of the next network station group 2 within the memory. In this case, in order to reset the read-address to the position where the next PI code is stored, since it is required two areas of AF data for storing the PI code, fixed value of 2+8=10 is added to the read-address (STEP $S_{43}$) when the storing capacity of the AF data is to be [8] as stated above. Next, there is implemented the judgement whether or not check of all PI codes is performed (STEP $S_{44}$). When the check in terms of all PI code is not performed yet, returning to STEP $S_{42}$ again, before implementing the processing after STEP $S_{42}$ repeatedly. Namely, in the case of memory whose constitution is shown in FIGS. 2A, the area 53 of the next network station group 3 becomes candidate of searching processing.

In STEP $S_{44}$, although there is judged that the check of all PI code is terminated. When agreed PI codes does not exist, the received PI code is stored in the next area (in case of FIG. 2A, free area 54) of area of the lastly checked network station group in order to add data as newly data of the network station group (STEP $S_{45}$). Next, the AF data corresponding to the PI code is stored (STEP $S_{46}$). FIG. 2B shows constitution content of the memory. PI code [$PI_4$], AF data [$AF_{4/1}$], and area 55 including free area are set. Remaining area becomes free area 56. When there exists agreed PI code, the AF data existing within the area is shifted successively, in order to add to be stored the AF data corresponding to the area of network station group of the PI code (STEP $S_{47}$). A newly received AF data is stored at the position where comes free by shifting (STEP $S_{48}$). FIG. 2C shows an example of memory constitution where the received PI code agrees with the PI code [$PI_3$] of the area 53 of the network station group 3. An AF data [$AF_{3/0}$] corresponding to the newly received PI code [$PI_3$] is set to the area 53 of the network station group 3. Thus, the received data is successively stored within the memory in every reception of the data of the network station group. A data-table consisting of the data from the corresponding plural network station group is constructed successively within the memory of the respective stations.

Next, procedure of searching required PI code from the constructed data-table by the above-described method will be explained. The processing procedure of searching method in terms of constructed data-table in the former example is shown in the flowchart of FIG. 3. In FIG. 3, the read-address is set to the head address of the mamory in order to implement searching processing from the head address successively (STEP $S_{61}$). Next, the PI code read-out through STEP $S_{61}$ is compared with the PI code of searching candidate, thus judging whether or not the read-out PI code agrees with the PI code of searching candidate (STEP $S_{62}$). In STEP $S_{62}$, when the read-out PI code disagrees with the PI code of searching candidate, the read-address is set to the address position where PI code of next network station group is stored, within the memory. In this case, in order to reset the read-address to the position where next PI code is stored, fixed value of 2+8=10 is added to the read-address, when storing capacity of the AF date is to be [8] (STEP $S_{63}$). Next, there is implemented judgement whether or not check in terms of all PI codes is performed (STEP $S_{64}$). When the check in terms of all PI codes is not performed, returning to STEP $S_{62}$ again, processing after STEP $S_{62}$ is implemented repeatedly. In STEP $S_{64}$, although there is judged that check of all PI codes is terminated, when agreed PI code does not exist, the searching processing is terminated. When there exists agreed PI code, the processing corresponding to the case where the PI code is discovered, is executed (STEP $S_{65}$).

In the above described data storing method, since storing capacity of the memory is fixed, there is a problem that too much or too little state arise at the memory capacity corresponding to respective PI code. To this state, in the former data searching method, as shown in FIG. 5, in terms of address of the memory, the data of the data-table constructed by the data storing method in which the PI code and the AF data are stored continuously is searched. As shown in flowchart of FIG. 4, in order to implement the searching processing from the head address in order, the read-address is set to the head address of the memory in which the PI code [$PI_1$] is stored in the area of the network station group 1 (STEP $S_{71}$). Next, the PI code read-out through STEP $S_{71}$ is compared with the PI code of searching candidate, thus judging whether or not the read-out PI code agrees with the PI code of searching candidate (STEP $S_{72}$). When the read-out PI code in STEP $S_{72}$ disagrees with the PI code of searching candidate, the read-address is set to the number of $AF_1$data [$AF_1$-number] stored at the next address position of the PI code [$PI_1$]. In this case, in order to reset the read-address to the next address position, fixed value of [2] is added to the read-address (STEP $S_{73}$). Next, the read-address is set to the storing position of the head of PI code [$PI_2$] of area of the next network station group 2. In this case, in order to reset the read-address to the position where the next PI code is stored, undefined value of $AF_1$ data number [$AF_1$ number]+1 is added to the read-address (STEP $S_{74}$). Next, there is implemented judgement whether or not check of all PI codes is performed (STEP $S_{75}$). When the check in terms of all PI code is not performed, returning to STEP $S_{72}$ again, the processing after STEP $S_{72}$ is performed repeatedly. In STEP $S_{75}$, although there is judged that the check of all PI codes is terminated, when agreed PI code does not exist, the searching processing is terminated. When agreed PI code exists, the processing corresponding to the processing implemented when the PI code is discovered is executed (STEP $S_{76}$).

In the above described former data storing method, the storing capacity of the memory is fixed with taking high speed of processing into account. For this reason, for example, when the storing capacity of the AF data of one PI code is to be [8], areas of 8 byte are used for storing PI code with 5 pieces of AF data. The areas of 8−5=3 byte of 8 byte are free areas which are not used. Conversely, when it permits PI code with AF data more than 9 data to store, since storing capacity is [8], the AF data which is capable of being stored is to 8 data. At this time, AF data which is incapable of being stored is superseded. Namely, in the former data storing method, when there are not many quantity of received AF data, free areas exit within memory, while when there are a lot of quantity of AF data, it is incapable of storing the AF data because of insufficient memory capacity.

In order to cope with the defect described above, when it searches data which is only stored successively to construct data of the data table from either head of the memory or one direction of the rearmost, the stored address of respective PI code comes into undefined, it becomes impossible to find stored address of the PI code by only simple addition-processing of the fixed value. For example, in the case of memory constitution view shown in FIG. 5, in order to store data successively, data denoting stored number of the AF data is added to next address of the PI code. At the time of searching of PI code, in order to find stored address of the next PI code, it becomes necessary to implement addition-processing (STEP $S_{74}$ of FIG. 4) after reading out of the data. Consequently, there is defect that processing time thereof is increased.

SUMMARY OF THE INVENTION

In view of the foregoing, it is an object of the present invention to provide a data storing method and a data searching method for the stored data in which it causes employment efficiency of the memory to improve at the time of memory storing for RDS reception data, and high-speed searching processing of the PI code is capable of being maintained, while eliminating unnecessary free area by adjusting storing capacity of AF data in every network station group.

According to one aspect of the present invention, for achieving the above-mentioned objects, there is provided a data storing method for storing a first data group consisting of a plurality of data whose data size are fixed and equivalent to one another, and for storing a second data group corresponding to respective data contained within the first data group, the second data group consisting of a plurality of data whose data size are arbitrary, causing the first data group and the second data group to stored within the required data storing region, the data storing method comprises the steps of storing the first data group in the direction from head address of the data storing region to the last address thereof in order, and storing the second data group in the direction from the last address of the data storing region to the head address thereof in order.

In the above aspect, respective data contained within the second data group is respectively separated by delimiter-data.

According to another aspect of the invention there is provided a data storing method wherein a data storing method for storing a first data to be stored as an a storing candidate in regard to storing region of the first data group, and for storing a second data to be stored as a storing candidate in regard to storing region of the second data group comprises a first step for setting a read-address to a head address of the storing region of the first data group, a second step for judging whether or not data of the first data group read-out through the first step agrees with the first data to be stored, a third step for resetting the read-address to address of next data of the first data group when data of the first data group disagrees with the first data to be stored, a fourth step for returning toward the second step when jundgement of agreement is not terminated yet, after judging whether or not judgement of agreement is implemented between all data of the first data group and the first data to be stored, a fifth step for storing the first data to be stored at the rearmost of the first data group when there exists no data which agrees with the stored data within the first data group, after terminating judgement of agreement in the fourth step, a sixth step for storing the second data to be stored and new delimiter-data into next address of the delimiter-data stored at the rearmost of data storing region of the second data group, and a seventh step for adding the second data to be stored data storing region of the second data group corresponding to data of the agreed first data group when judging is implemented whether or not the data of the first data group agrees with the first data to be stored.

The seventh step of the above another aspect also comprises a step for shifting data from data of the second data group to data of the rearmost of the second data group corresponding to data of the first data group in the backward direction, and a step for storing the second data to be stored at the head of data storing region of the second data group.

In the above first aspect of the invention, a data storing method further comprises the steps of storing PI code of network received from broadcasting of Radio-Data-System developed by European Broadcasting Union as said first data group, and storing AF data of station constituting network which receives said broadcasting of Radio-Data-System as said second data group.

According to the data searching method for the above another aspect, the data searching method for searching data storing position of data of the second data group corresponding to data of the first data group in terms of data storing method described therein, comprises a first step for setting read-address to head address of storing region of a first data group, a second step for judging whether or not data of the first data group read-out through the first step agrees with the first data to be stored, a third step for resetting the read-address to address of next data of the first data group when data of the first data group disagrees with the first data to be stored, a fourth step for returning toward the second step when judgement of agreement is not terminated yet, after judging whether or not judgement of agreement is implemented between all data of the first data group and the first data to be stored, and a fifth step for searching data stored region of said second data group corresponding to data of said agreed first data group in the rearward direction using said delimiter-data when judging is implemented whether or not data of said first data group agrees with said first data to be stored.

The above and further objects and novel feature of the invention witll be more fully understood from the following detailed description when the same is read in connection with the accompanying drawings. It should be expressly understood, however that the drawings are for purpose of illustration only and are not intended as a definition of the limits of the invention.

DETAILED DESCRIPTION OF THE PREFERRED EMBODIMENTS

A preferred embodiment of the present invention will now be described in detail referring to the accompanying drawings.

Figure 6:
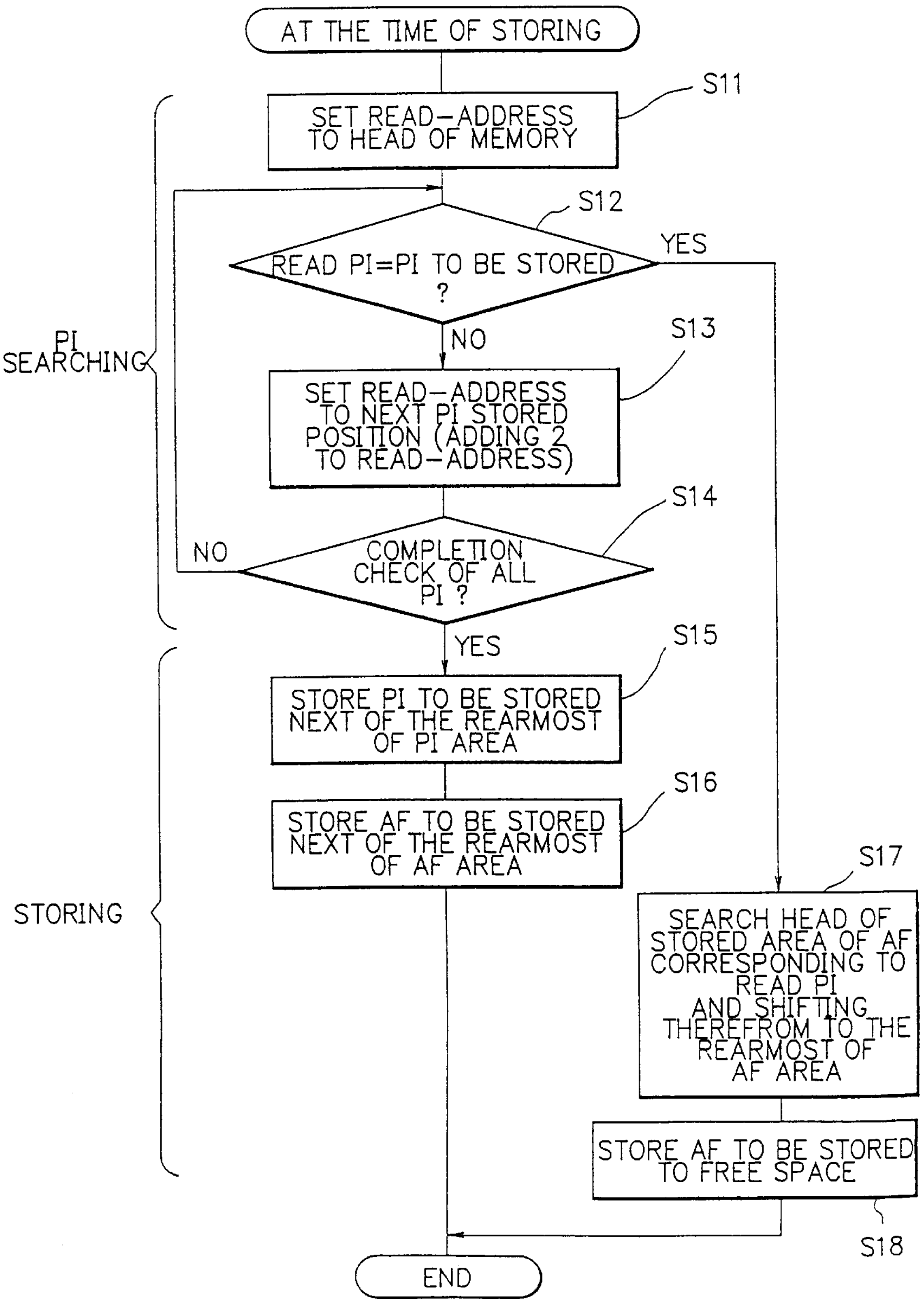
FIG. 6 is a flowchart showing processing procedure in one embodiment according to the present invention.
Figure 7A:
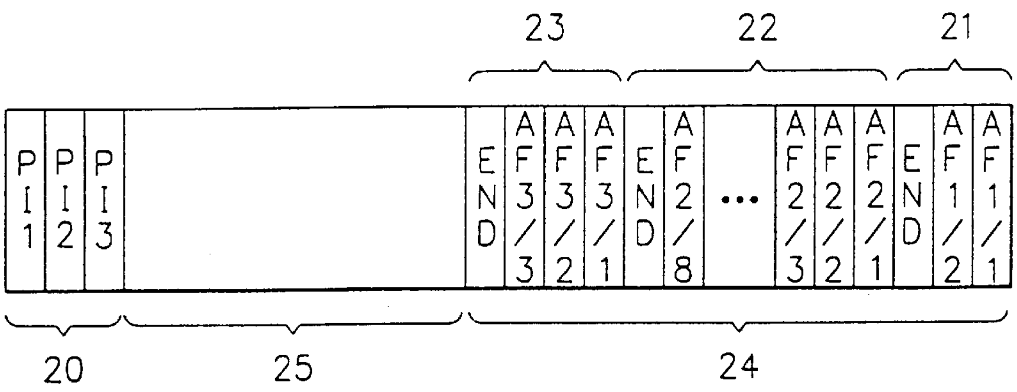
FIGS. 7A, 7B, and 7C are memory constitution views corresponding to the embodiment of FIG. 6.
Figure 7B:
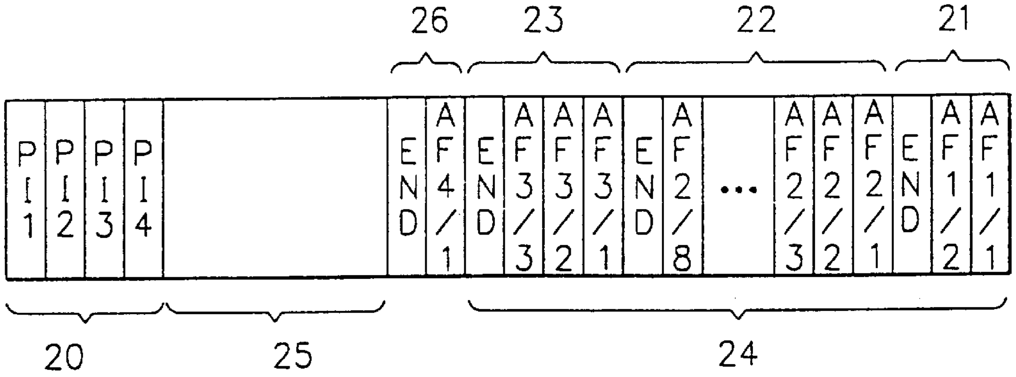
Figure 7C:
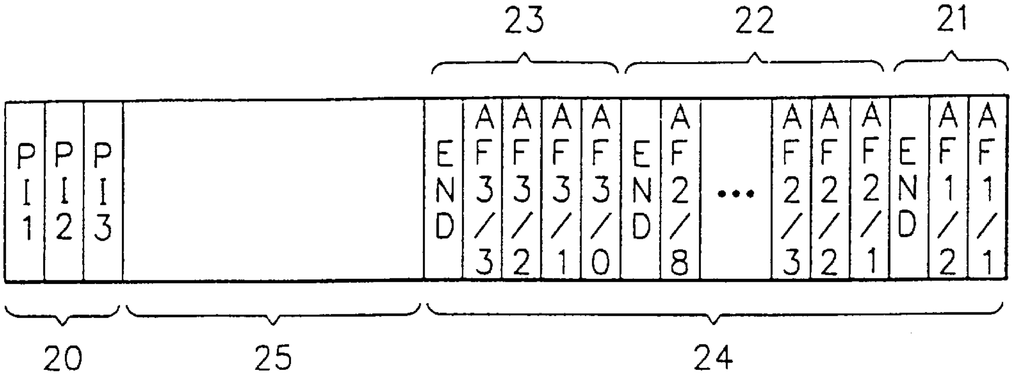

FIG. 6 is a flowchart showing data storing method of one embodiment according to the present invention. FIGS. 7A, 7B, and 7C are views showing memory constitution of candidate of data storing. Hereinafter, the embodiment of data storing method using 8-bits single-chip-microcomputer will be described referring to the flowchart of FIG. 6 and memory constitution views of FIGS. 7A, 7B and 7C. As example of the memory constitution view of FIG. 7A, the memory constitution consists of PI area 20, an AF area 24 including an AF area 21 of a network station group 1, an AF area 22 of a network station group 2, and an AF area 23 of a network station group 3, and a free area 25.

In FIG. 6, in the same way as the former example, when it causes an AF data of received RDS signal data to store on a memory within the station, in order to gather to be stored AF data of identical PI code, searching processing of the PI code within the memory is implemented in the first place. In this case, in the present embodiment, in order to implement this searching processing from the first address of the memory in turn, a read-address is set to the head position of the PI aea 20 within the memory in the memory constitution view of FIG. 7A (STEP $S_{11}$ of FIG. 6). As it is clear from FIG. 7A, the PI code [$PI_1$] is stored in the head address. The read-out PI code [$PI_1$] is compared with a newly received PI code which is a candidate for storing, thus being judged whether or not the PI code [$PI_1$] agrees with the newly received PI code (STEP $S_{12}$). In STEP $S_{12}$, when the received PI code disagrees with the PI code [$PI_1$], a read-address is set to address position where next PI code [$PI_2$] within PI area 20 is stored. In this case, in order to reset the read-address to a position where the next PI code is stored, fixed value [2] is added to the read-address (STEP $S_{13}$). Next, there is implemented the judgement whether or not check in terms of all PI code is executed (STEP $S_{14}$). When the check in terms of the all PI code is not executed yet, returning to STEP $S_{12}$ again, processing after STEP $S_{12}$ is implemented repeatedly. In STEP $S_{14}$, although there is judged that the check of all PI codes is terminated. When agreed PI code does not exist, the received PI code is stored in the next area of the lastly checked PI code on the inside of PI area 20, in order to add as newly data of the network station group (STEP $S_{15}$). The corresponding AF data is stored in the next area of the rearmost of stored data of the AF area 24 (STEP $S_{16}$). In this case, a content example of memory constitution is shown in FIG. 7B. A PI code [$PI_4$] is newly stored in the PI area 20. A new area 26 is newly set to the next area of the rearmost area [END] of the AF area 23 of the network station group 3. The AF data [$AF_{4/1}$] and [END] corresponding to the PI code [$PI_4$] are stored. When agreed PI code exists, a head address of AF area for the network station group is searched for additionally storing corresponding AF data in relation to the AF area of the network station group of the PI code. AF data is shifted one by one from the head address to the area of the rearmost of the AF area (STEP $S_{17}$). A newly received AF data is stored in a free address area (STEP $S_{18}$).

FIG. 7C shows the memory constitution in which the received PI code agrees with the PI code [$PI_3$] of the AF area 23 of the network station group 3. An AF data [$AF_{3/0}$] corresponding to the received PI code [$PI_3$] is newly stored to be set within the free area due to the shift of the AF area 23 of the network station group 3. Thus, the received data is successively stored within the memory in every reception of data of the network station group. A data-table consisting of data from the corresponding plural network station group is constructed within the memory of the respective stations.

Figure 1:
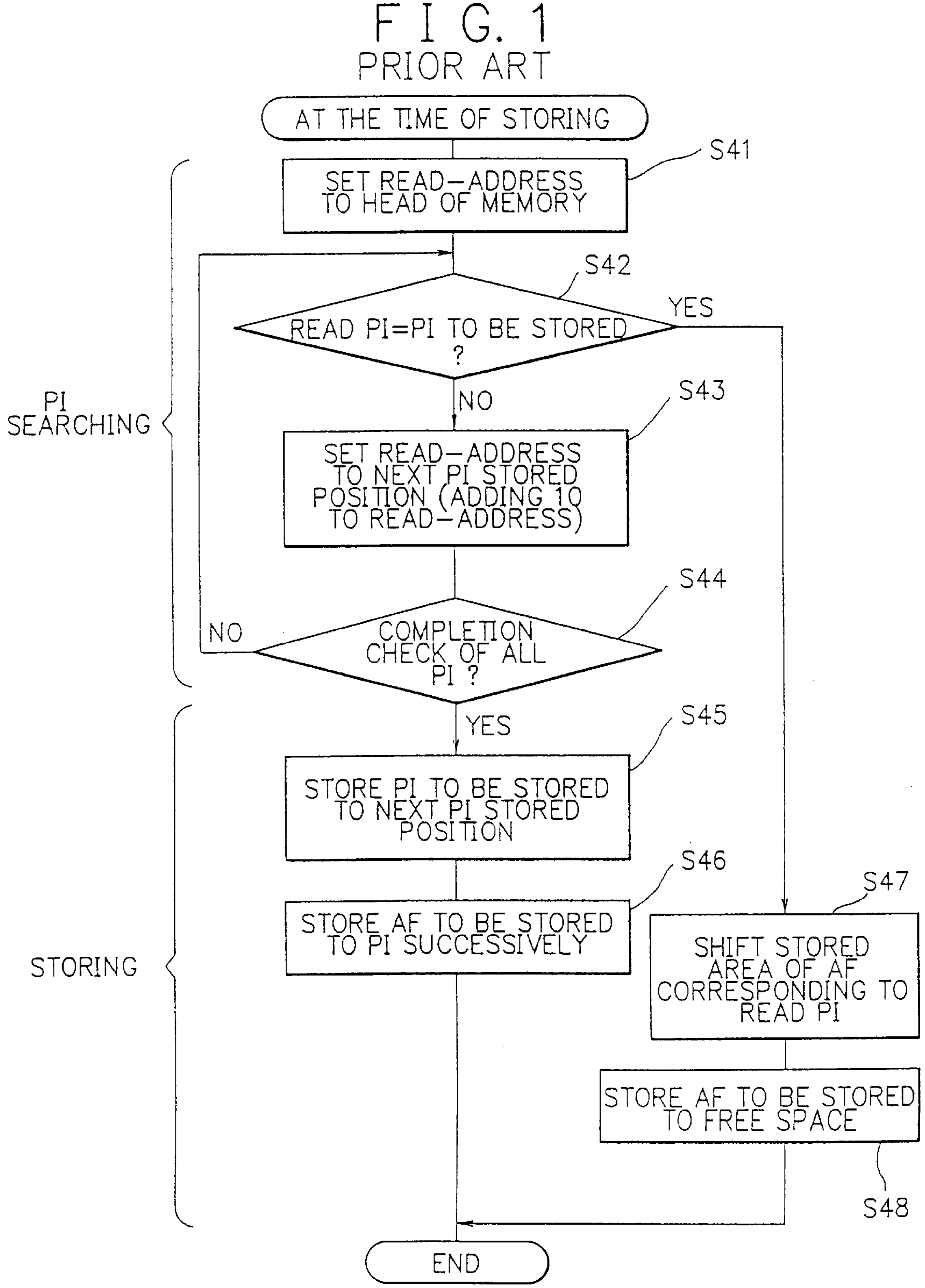
F I G. 1 PRIOR ART
FIG. 1 is a flowchart showing data storing processing procedure in the former example.
Figure 2A:
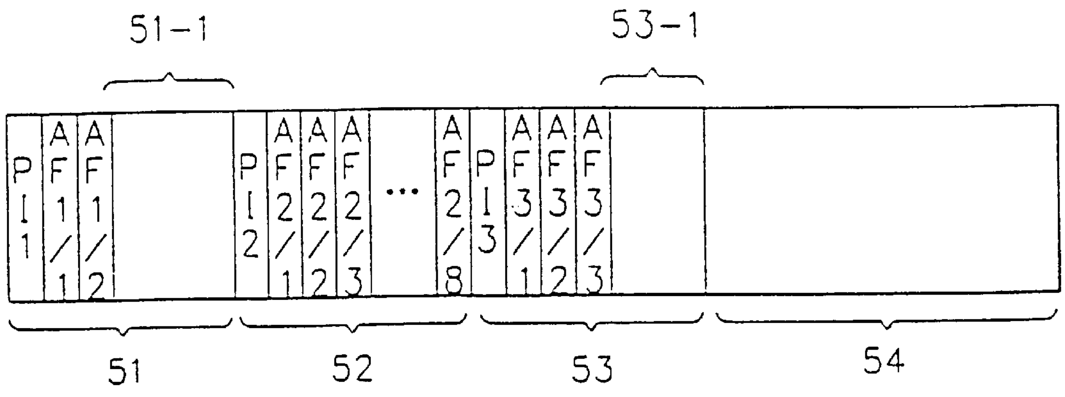
FIG. 2A PRIOR ART
FIGS. 2A, 2B and 2C a view showing an example of memory constitution in the former example.
Figure 2B:
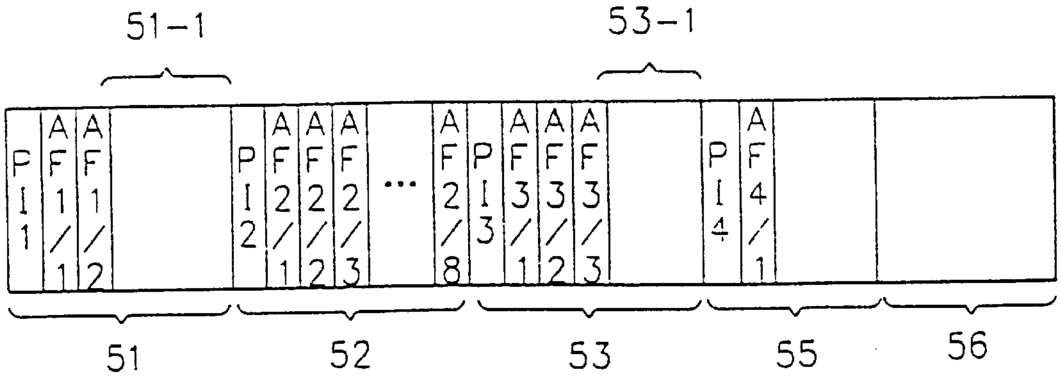
FIG. 2B PRIOR ART
Figure 2C:
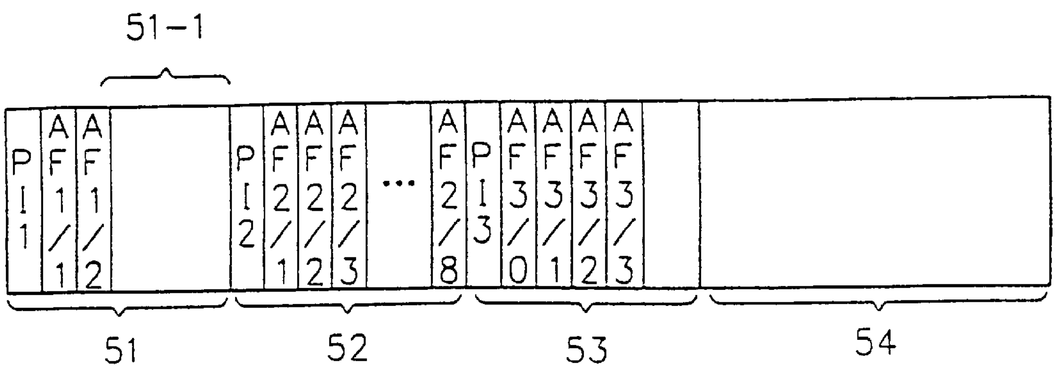
FIG. 2C PRIOR ART
Figure 3:
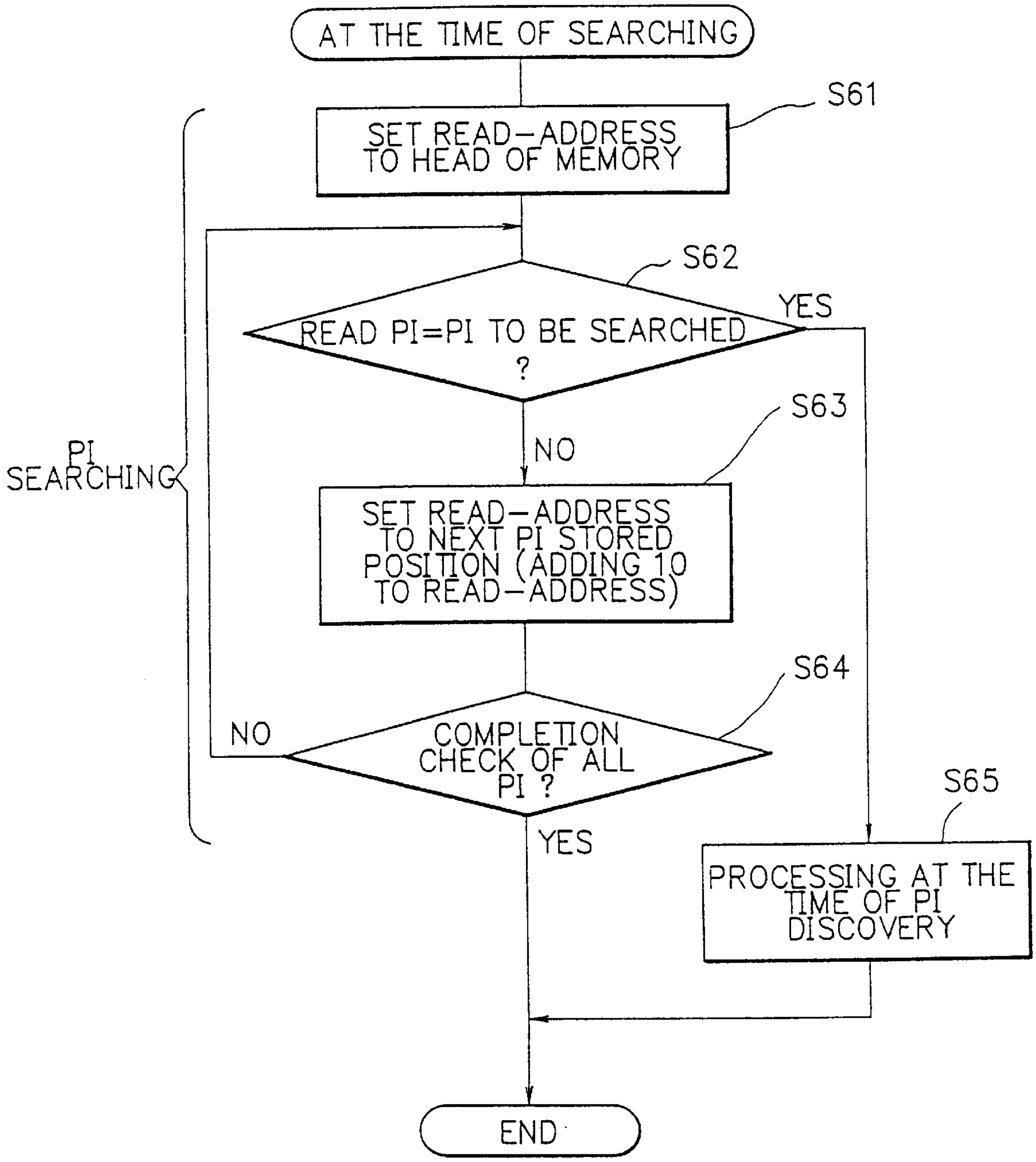
FIG. 3 PRIOR ART
FIG. 3 is a flowchart showing data searching processing procedure in the former example.
Figure 4:
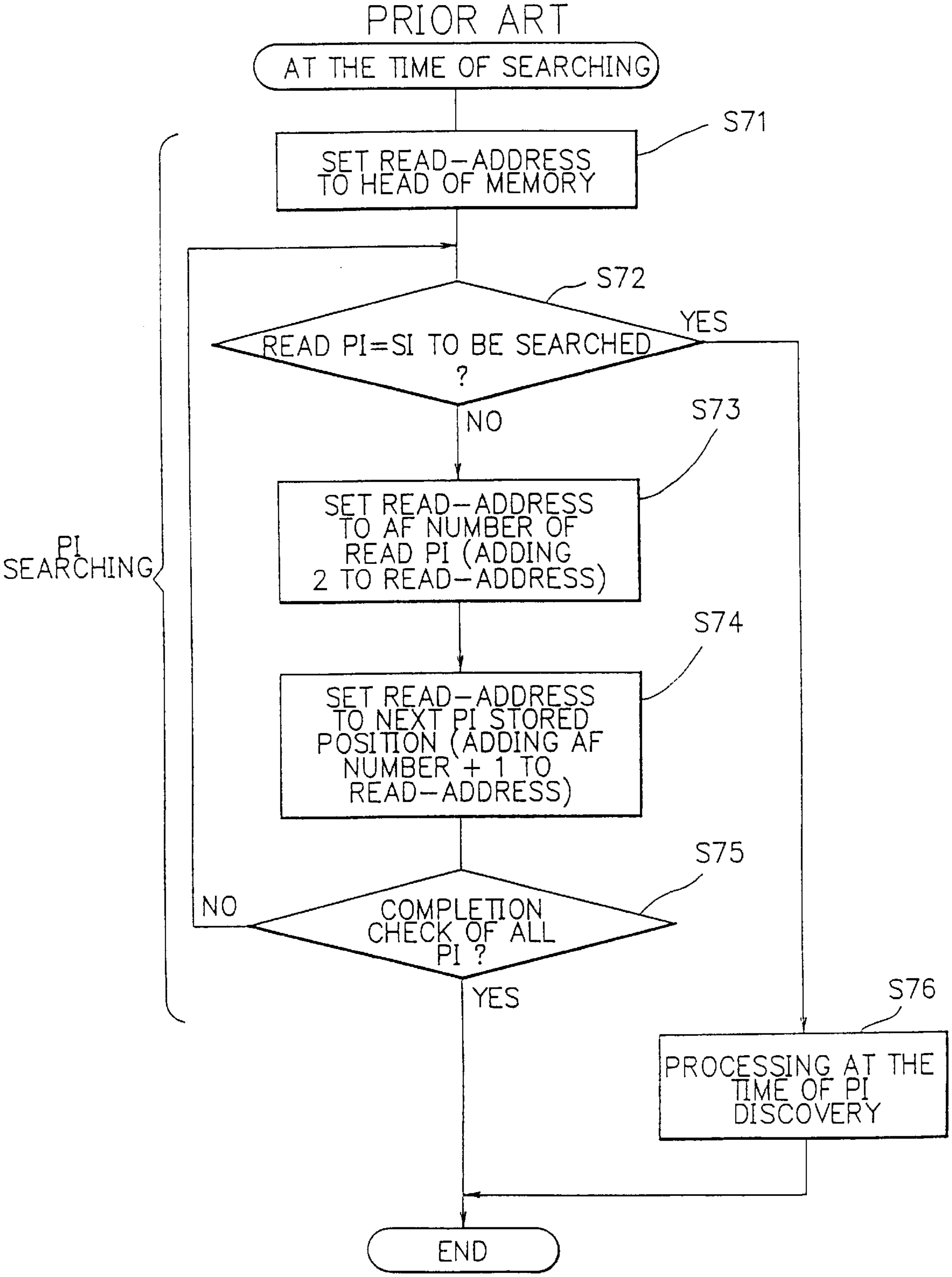
FIG. 4 PRIOR ART
FIG. 4 is a flowchart showing former data searching processing procedure in case of being stored successively.
Figure 5:
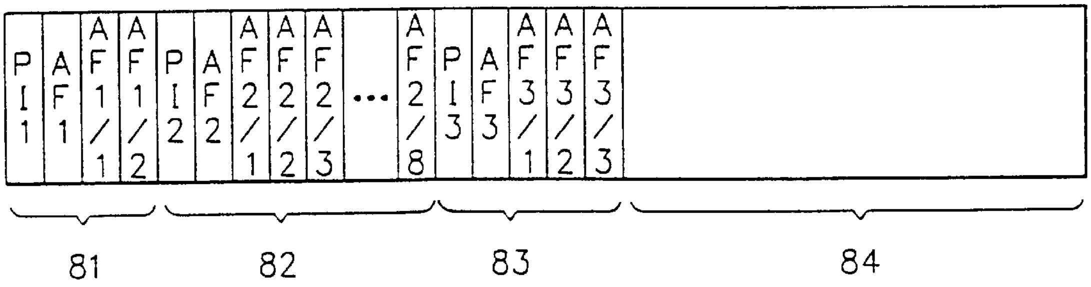
FIG. 5 PRIOR ART
FIG. 5 is a memory constitution view corresponding to the former example in case of being stored successively.
Figure 8:
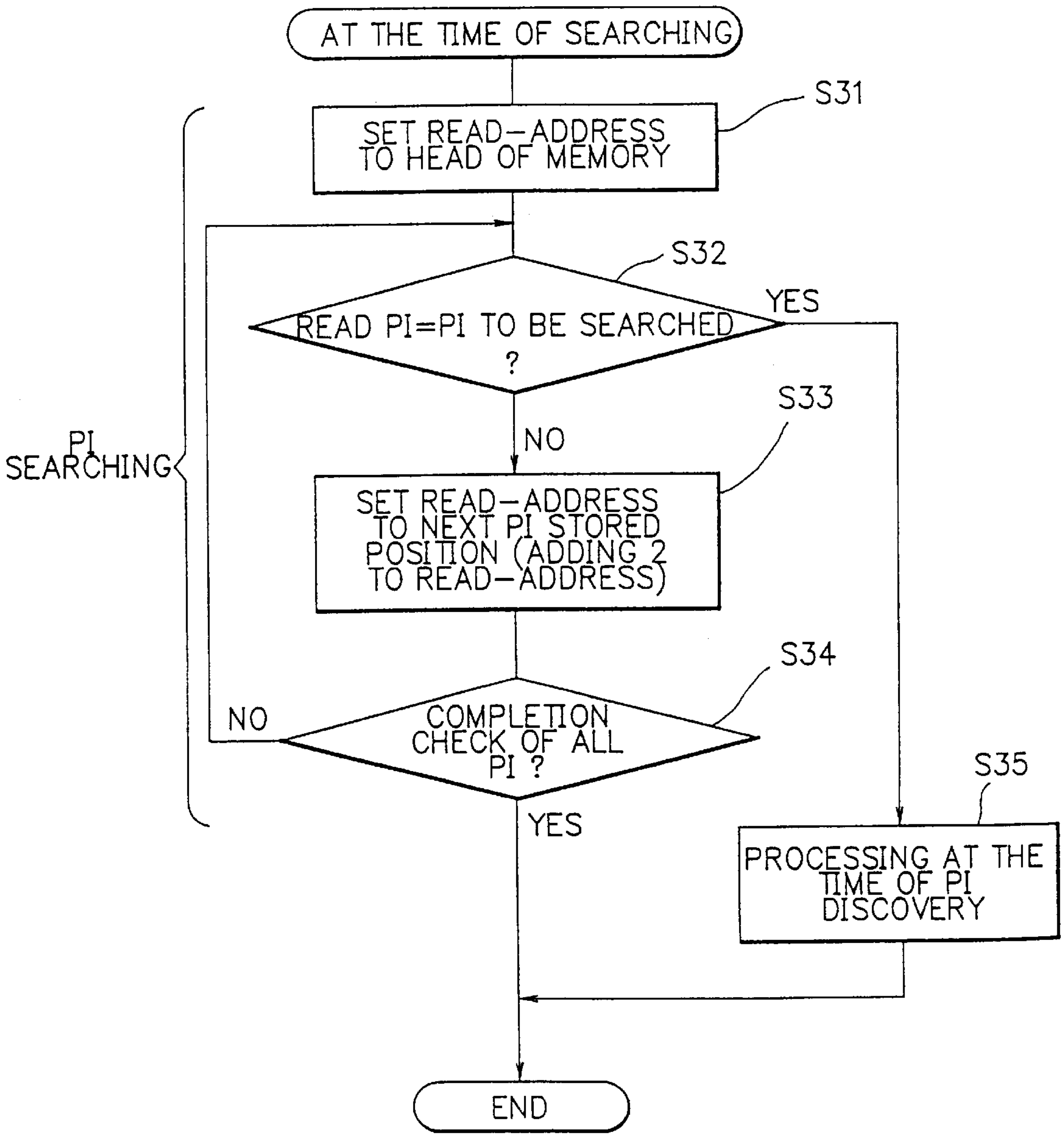
FIG. 8 is a flowchart showing processing procedure in another embodiment according to the present invention.

Next, FIG. 8 is a frowchart showing a processing procedure of one embodiment of a data searching method of the present invention in terms of the data-table consisting of data stored by data storing method of the embodiment of the invention. In FIG. 8, in order to implement the searching processing successively from the head address of the memory, read-address is set to a head position of the PI area 20 within the memory (STEP $S_{31}$ of FIG. 3). As it is clear from FIG. 7A, the PI code [$PI_1$] is stored in the head address. A read PI code [$PI_1$] is compared with the PI code of searching candidate, thus being judged whether or not the [$PI_1$] agrees with the PI code of searching candidate (STEP $S_{32}$). In STEP $S_{32}$, when the PI code of searching candidate disagrees with the PI code [$PI_1$], a read-address is set to an address position where the next PI code [$PI_2$] within the PI area 20 is stored. In this case, a fixed value [2] is added to the read-address in order to reset the read-address to the position where the next PI code is stored (STEP $S_{33}$). Next, there is implemented the judgement whether or not check in terms of the all PI codes is executed (STEP $S_{34}$). When the check in terms of the all PI codes is not executed yet, returning to STEP $S_{32}$ again, processing after STEP $S_{32}$ is implemented repeatedly. In STEP $S_{34}$, although there is judged that the check of the all PI code is terminated, when agreed PI code does not exist, the searching processing is terminated. when the agreed PI code exists, the processing corresponding to the processing which is implemented at the time of discovery of the PI code is executed (STEP $S_{35}$).

In the processing procedure at the time of discovery of STEP $S_{35}$, when the AF data is required, that AF data corresponding to the discovered PI code is capable of being obtained by counting delimiter from the rearmost of the memory in order. This can be accomplished from the fact that the storing order of the PI code counted from the head of the memory is equivalent to the storing order of the AF data counted from the rearmost of the memory. As it is clear under this state, when it takes note of the processing procedure in which it permits the read-address to reset to the position where next PI code is stored, also in both cases of data storing and data searching, it is necessary the processing procedure to add [2] of storing component of the PI code to the read-address.

Namely, in the data storing method of the invention, since storing capacity of the AF data agrees with the respective network station, free area does not exit within the memory. Consequently, it becomes possible to improve the employment efficiency of the memory. In the data searching method for searching the data-table formed due to the data storing method, when it permits the read-address to set to the storing address of the next PI code, it is necessary to implement only the processing procedure of adding [2] which is corresponding to data storing of the PI code. As a result, it becomes possible to implement high spped searching processing.

As described above, in the data storing method according to the present invention, since it causes storing capacity of the AF data to adjust to the same capacity in every network station each, even if a quantity of the AF data in terms of the PI code of the received RDS receotion data is insufficient, free area does not exist within the memory. If a quantity of the AF data in terms of the PI code of the received RDS reception data is increased in quantity, it can reduced the case where the AF data is incapable of being stored because of insufficient memory capacity. There is the effect that employment efficiency of the memory of respective network station is capable of being improved.

In the data searching method for searching the data-table formed by the data storing method, since the processing is terminated by only implementing the processing procedure of adding [2] which is corresponding to data storing of the PI code, by reducing excessive processing procedure in the searching processing, there is the effect that processing speed is capable of being improved in comparison with the former searching method.

While preferred embodiments of the invention have been described using specific terms, such description is for illustrative purpose only, and it is to be understood that changes and variations may be made without departing from the spirit or scope of the following claims.

What is claimed is:

1. A data storing method for storing a first data group consisting of a plurality of data whose data size are fixed and equivalent to one another, and for storing a second data group corresponding to respective data contained within said first data group, said second data group consisting of a plurality of data whose data size are arbitrary, variable and independent of the data in said first data group, causing said first data group and said second data group to store within a prescribed data storing region, comprising the steps of:

storing said plurality of data of said first data group in a direction from first to last in order; and storing said plurality of data of said second data group, which are corresponding to respective data within said first data group, in adjacent locations backward from the end of said prescribed data storage region, wherein respective data contained within said second data group is respectively separated by delimiter data, and wherein the steps of storing said first data group and said second data group comprise the steps of:

a first step for setting a read address to a head address of said storing region of said first data group;

a second step for judging whether or not data of said first data group read-out through said first step agrees with said first data to be stored;

a third step for resetting said read address to an address of a next data of said first data group when data of said first data group disagrees with said first data to be stored;

a fourth step for repeating said judging step when judgement of agreement is not yet terminated, after judging whether or not judgement of agreement of implemented between all data of said first data group and said first data to be stored;

a fifth step for storing said first data to be stored at the rearmost of said first data group when there exists no data which agrees with said stored data within said first data group, after terminating judgment of agreement in said fourth step;

a sixth step for storing said second data to be stored and new delimiter data into a next address of said delimiter data stored at the rearmost of data storing region of said second data group; and a seventh step for adding said second data to be stored in the data storing region of said second data group corresponding to data of said agreed first data group when judging is implemented whether or not data of said first data group agrees with said first data to be stored.

2. A data storing method according to claim 1, wherein said seventh step comprises:

a step for shifting data from data of said second data group to data of the rearmost of said second data group which correspond to data of said first data group, in the backward direction; and a step for storing said second data to be stored at the head of data storing region of said second data group.

3. A data searching method for searching a data stored position of data of said second data group corresponding to data of said first data group in terms of the data storing method of claim 2 comprising:

a first step for setting a read-address to a head address of a stored region of a first data group;

a second step for judging whether or not data of said first data group read-out through said first step agrees with said first data to be stored;

a third step for resetting said read-address to an address of a next data of said first data group when data of said first data group disagrees with said first data to be stored;

a fourth step for returning to said second step when judgement is not terminated yet, after judging whether or not judgement of agreement is implemented between all data of said first data group and said first data to be stored; and a fifth step for searching a data stored region of said second data group corresponding to data of said agreed first data group in the rearward direction using said delimiter-data when judging is implemented whether or not data of said first data group agrees with said first data to be stored.

4. A data searching method for searching a data stored position of data of said second data group corresponding to data of said first data group in terms of the data storing method of claim 1 comprising:

a first step for setting a read-address to a head address of a stored region of a first data group;

a second step for judging whether or not data of said first data group read-out through said first step agrees with said first data to be stored;

a third step for resetting said read-address to an address of a next data of said first data group when data of said first data group disagrees with said first data to be stored;

a fourth step for returning to said second step when judgement is not terminated yet, after judging whether or not judgement of agreement is implemented between all data of said first data group and said first data to be stored; and a fifth step for searching a data stored region of said second data group corresponding to data of said agreed first data group in the rearward direction using said delimiter-data when judging is implemented whether or not data of said first data group agrees with said first data to be stored.

5. A data storing method for storing a plurality of first type data and a plurality of second type data in memory means, said second type data are categorized as a plurality of groups for corresponding to said first type data, comprising the steps of:

storing said first type data from the head address of said memory means in an order from first received first type data to latest received first type data; and storing said second type data backward from the tail address of said memory means in an order from a first categorized group of said second type data to a last categorized group of said second type data, wherein the step of storing said second type data comprises steps of:

determining if newly received first type data is previously stored;

storing newly received additional second type data, which corresponds to said newly received first type data, to a relevant categorized group, if said first type data is previously stored; and otherwise appending said newly received additional second type data at an address of said free area which is adjacent to previously stored second type data;

wherein said first type data are stored from the head address toward to a free area of said memory means, and said second type data are stored from the tail address backward to said free area, in which each said categorized group includes at least one of said second type data arranged backward from the rearmost of said categorized group by a received order, wherein the step of storing said newly received additional second type data comprises the steps of:

searching corresponding categorized group of said newly received second type data;

shifting data which are between said corresponding categorized group and said last categorized group backward for obtaining a spare address; and storing said newly received second type data to said spare address.

6. A data storing method for storing a first data group consisting of a plurality of data whose data size are fixed and equivalent to one another, and for storing and searching a second data group corresponding to respective data contained within said first data group, said second data group consisting of a plurality of data whose data size are arbitrary, variable and independent of the data in said first data group, causing said first data group and said second data group to store within a prescribed data storing region, comprising the steps of:

storing said plurality of data of said first data group in a direction from first to last in order;

storing said plurality of data of said second data group, which are corresponding to respective data within said first data group, in adjacent locations backward from the end of said prescribed data storage region, wherein respective data contained within said second data group is respectively separated by delimiter data, and wherein the steps of storing said first data group and said second data group comprise:

a first storing step for setting a read address to a head address of said storing region of said first data group;

a second storing step for judging whether or not data of said first data group read-out through said first step agrees with said first data to be stored;

a third storing step for resetting said read address to an address of a next data of said first data group when data of said first data group disagrees with said first data to be stored;

a fourth storing step for repeating said judging step when judgement of agreement is not yet terminated, after judging whether or not judgement of agreement of implemented between all data of said first data group and said first data to be stored;

a fifth storing step for storing said first data to be stored at the rearmost of said first data group when there exists no data which agrees with said stored data within said first data group, after terminating judgment of agreement in said fourth step;

a sixth storing step for storing said second data to be stored and new delimiter data into a next address of said delimiter data stored at the rearmost of data storing region of said second data group; and a seventh storing step for adding said second data to be stored in the data storing region of said second data group corresponding to data of said agreed first data group when judging is implemented whether or not data of said first data group agrees with said first data to be stored;

and wherein the data searching method for searching a data stored position of data of said second data group corresponding to data of said first data group comprises:

a first searching step of setting a read-address to a head address of a stored region of a first data group;

a second searching step for judging whether or not data of said first data group read-out through said first step agrees with said first data to be stored;

a third searching step for resetting said read-address to an address of a next data of said first data group when data of said first data group disagrees with said first data to be stored;

a fourth searching step for returning to said second step when judgement is not terminated yet, after judging whether or not judgement of agreement is implemented between all data of said first data group and said first data to be stored; and a fifth searching step for searching a data stored region of said second data group corresponding to data of said agreed first data group in the rearward direction using said delimiter-data when judging is implemented whether or not data of said first data group agrees with said first data to be stored.

* * * * *